United States Patent
Li et al.

(10) Patent No.: US 8,501,657 B2
(45) Date of Patent: Aug. 6, 2013

(54) CATALYST FOR DESULFURIZATION AND DEODORIZATION OF GASOLINE AND METHOD FOR PREPARATION OF THE SAME AND USE THEREOF

(75) Inventors: Can Li, Dalian (CN); Zongxuan Jiang, Dalian (CN); Yongna Zhang, Dalian (CN); Hongying Lv, Dalian (CN); Boyu Zhang, Dalian (CN)

(73) Assignee: Dalian Institute of Chemical Physics, Chinese Academy of Science, Dalian (CN)

( * ) Notice: Subject to any disclaimer, the term of this patent is extended or adjusted under 35 U.S.C. 154(b) by 250 days.

(21) Appl. No.: 12/933,313

(22) PCT Filed: Nov. 20, 2008

(86) PCT No.: PCT/CN2008/001893
§ 371 (c)(1),
(2), (4) Date: Sep. 17, 2010

(87) PCT Pub. No.: WO2009/117862
PCT Pub. Date: Oct. 1, 2009

(65) Prior Publication Data
US 2011/0015060 A1    Jan. 20, 2011

(30) Foreign Application Priority Data

Mar. 28, 2008 (CN) .......................... 2008 1 0010788

(51) Int. Cl.
*B01J 31/18* (2006.01)
*C10L 1/04* (2006.01)
*C10G 45/00* (2006.01)
*C10G 29/00* (2006.01)
*C10G 29/08* (2006.01)

(52) U.S. Cl.
USPC .......... 502/164; 208/208 R; 208/15; 208/143; 208/236

(58) Field of Classification Search
None
See application file for complete search history.

(56) References Cited

FOREIGN PATENT DOCUMENTS
| CN | 1248609 | 3/2000 |
|---|---|---|
| CN | 1872958 | 12/2006 |

(Continued)

OTHER PUBLICATIONS

Lu et al. Journal of Catalysis, 239, 2006, 369-375.*
Hu et al. Journal of Molecular catalysis A: Chemical 152 (2001) 141-155.*

*Primary Examiner* — Yun Qian
(74) *Attorney, Agent, or Firm* — VLP Law Group LLP; Enshan Hong

(57) ABSTRACT

A catalyst for the desulfurization and deodorization of gasoline, which is expressed by the formula: $Q_lB_mH_n[A_xM_yO_z]^{(1+m+n)-}$, where: Q denotes a quaternary ammonium cation consisting of $R_1R_2R_3R_4N^+$, in which $R_1$, $R_2$, $R_3$, and $R_4$ each denotes independently a $C_1$ to $C_{20}$ saturated alkyl group, respectively, provided that at least one of $R_1$, $R_2$, $R_3$, and $R_4$ denotes a $C_4$ to $C_{20}$ saturated alkyl group; B denotes a metal cation of $Na^+$ or/and $K^+$; H denotes a hydrogen atom; A denotes a central atom of B, P, As, Si or Al; M denotes a coordinated atom of W or Mo; O denotes an oxygen atom; $1 \leq l \leq 10$, $0 \leq m \leq 3$, $0 \leq n \leq 3$, $l+m+n \leq 14$, $x=1$ or $2$, $9 \leq y \leq 18$, $34 \leq z \leq 62$, and l, m, n, y and z all are integers. A method of the desulfurization and deodorization of gasoline by using the catalyst comprises the steps of: mixing the catalyst and an aqueous solution of hydrogen peroxide, and then adding the gasoline to react them with stirring under conditions of 25 to 90° C. and 0.1 to 1 MPa for 10 to 180 min. An odorless gasoline can be obtained through settlement or centrifugation, and the catalyst is recovered.

1 Claim, 2 Drawing Sheets

(56) References Cited

FOREIGN PATENT DOCUMENTS

| CN | 101003744 | 7/2007 |
|---|---|---|
| CN | 101007284 | 8/2007 |
| CN | 101011670 | 8/2007 |
| CN | 101063042 | 10/2007 |
| CN | 101077982 | 11/2007 |
| CN | 101081994 | 12/2007 |
| JP | 2004075633 | 3/2004 |

* cited by examiner

CATALYST FOR DESULFURIZATION AND DEODORIZATION OF GASOLINE AND METHOD FOR PREPARATION OF THE SAME AND USE THEREOF

PRIORITY CLAIM

This is a U.S. national stage of application No. PCT/CN2008/001893, filed on Nov. 20, 2008. Priority is claimed on China Application No. 200810010788.9, filed Mar. 28, 2008, the content of which is incorporated here by reference.

FIELD OF THE INVENTION

This invention relates to the deodorization of gasoline. More specifically, this invention relates to a catalyst for desulfurization and deodorization of gasoline and a method for preparation of the same and a use thereof.

BACKGROUND OF THE INVENTION

Deodorization of gasoline is one of the indispensable technical processes in petrochemical industry in order to remove the organic sulfides with malodor or transform the sulfides to odorless substances. With the exploitation of petroleum, the reserves of petroleum on earth becomes less and less. In recent years, as densification and inferiority of the crude oil, and improvement of the depth of processing for crude oil, the content of mercaptans and thioethers with more complex structures in gasoline from refinery factory becomes increasingly high. This leads to deodorization of gasoline becoming more difficult. Therefore, many refineries all over the world do their endeavor to develop new technologies to improve the efficiency of deodorization.

Mercaptans have the most harmful effect on the quality of gasoline, wherein mercaptans present in FCC (Fluid Catalytic Cracking) gasoline, thermal cracking gasoline, coker gasoline, and straight run gasoline result in the malodor of the gasoline product, since mercaptans are initiators of free radical, making the quality and stability of gasoline being decreased; and mercaptans themselves also have corrosiveness, causing the corrosion of the engine parts. Accordingly, it is necessary for gasoline to be deodorized in order to satisfy the requirements of production need and environmental protection.

At present, deodorization technology being widely used in industry is an alkali-free deodorization technology, which feature is that a feedstock oil and an activator solution are mixed completely by a mixer, followed by reacting with air when they are passed through the catalyst bed together with the air. The removal efficiency of mercaptans is relatively high, and the amount of sodium hydroxide used is decreased considerably.

Chinese Patent No. CN1248609A discloses a preparation method of a fixed bed catalyst impregnation solution, comprising: adding a phthalocyanine cobalt compound into a 0.5-2% of an aqueous solution of alkaline metal oxide (wherein the alkaline metal is referred to as potassium, sodium). Because the solution is strongly basic, the phthalocyanine cobalt compound could transform into the non-reactive component, leading to concentration of the active phthalocyanine cobalt compound in the impregnation solution being decreased.

U.S. Pat. No. 4,913,802 discloses a preparation method of an impregnation solution, comprising: adding a cobalt phthalocyanine into an aqueous mixed solution of 2% of ammonia and 1% of a quaternary ammonium base. Although the transformation from the cobalt phthalocyanine to non-reactive component is slowed down; the fixed bed catalyst prepared with the impregnation solution is prone to be leached during the deodorization, resulting in not only causing unfriendly a pollution on the environment, but also reducing the life time of the fixed-bed catalyst.

Chinese Patent No. CN101063042A discloses a method of desulfurization and deodorization via oxidation, comprising: taking heteropoly acids and heteropoly acid salts as homogeneous catalyst, and carrying out a reaction in highly effective mass transfer reactor with an internal strengthened swirling component to get the high-quality oil product with low-sulfur and no odor. However, it is too difficult for the method to recycle and reuse the homogeneous catalyst.

SUMMARY OF THE INVENTION

An object of the present invention is to provide a high efficient and recoverable catalyst for desulfurization and deodorization of gasoline.

Another object of the present invention is to provide a preparation method of the high efficient and recoverable catalyst for desulfurization and deodorization of gasoline.

A further object of the present invention is to provide a use of the catalyst for the desulfurization and deodorization of gasoline.

Another Object of the present invention is to provide a method of desulfurization and deodorization of gasoline by using the catalyst.

In order to achieve the above-mentioned objects, the invention uses the technical solutions of:

(1) A catalyst for the desulfurization and deodorization of gasoline, which is expressed by the formula:

$$Q_l B_m H_n [A_x M_y O_z]^{(l+m+n)-}$$

where:

Q denotes a quaternary ammonium cation consisting of $R_1 R_2 R_3 R_4 N^+$, in which $R_1$, $R_2$, $R_3$, and $R_4$ each denotes independently a $C_1$ to $C_{20}$ saturated alkyl group, provided that at least one of $R_1$, $R_2$, $R_3$, and $R_4$ denotes a $C_4$ to $C_{20}$ saturated alkyl group;

B denotes a metal cation of $Na^+$ or/and $K^+$;

H denotes a hydrogen atom;

A denotes a central atom of B, P, As, Si or Al;

M denotes a coordinated atom of W or Mo;

O denotes an oxygen atom;

$1 \leq l \leq 10$, $0 \leq m \leq 3$, $l+m+n \leq 14$, x=1 or 2, $9 \leq y \leq 18$, $34 \leq z \leq 62$, and l, m, n, y and z all are integers.

(2) The catalyst according to the above (1), characterized in that the quaternary ammonium cation is one or more of the following quaternary ammonium cations: $(C_4H_9)_4N^+$, $(C_8H_{17})_4N^+$, $(C_8H_{17})_3CH_3N^+$, $(C_8H_{17})_2(CH_3)_2N^+$, $(C_8H_{17})(CH_3)_3N^+$, $(C_{12}H_{25})_4N^+$, $(C_{12}H_{25})_3CH_3N^+$, $(C_{12}H_2)_2(CH_3)_2N^+$, $(C_{12}H_{25})(CH_3)_3N^+$, $(C_{16}H_{33})_4N^+$, $(C_{16}H_{33})_3(CH_3)N^+$, $(C_{16}H_{33})_2(CH_3)_2N^+$, $(C_{16}H_{33})(CH_3)_3N^+$, $(\pi\text{-}C_5H_5N^+ C_{16}H_{33})$, $[(C_{18}H_{37})(75\%)+(C_{16}H_{33})(25\%)]_2N^+(CH_3)_2$, $(C_{18}H_{37})_2N^+(CH_3)_2$, or $(C_{18}H_{37})N^+(CH_3)_3$.

(3) The catalyst according to the above (1), wherein the catalyst is one or more of the following catalysts: $[C_{18}H_{37}N(CH_3)_3]_4H_2Na[PW_{10}O_{36}]$, $[C_8H_{17}N(CH_3)_3]_4HNa_2[PW_{10}O_{36}]$, $[C_{12}H_{25}N(CH_3)_3]_4H_3[PW_{10}O_{36}]$, $[C_{16}H_{33}N(CH_3)_3]_4Na_3[PW_{10}O_{36}]$, $[(C_{18}H_{37})_2N(CH_3)_2]_3$

[(C$_{16}$H$_{33}$)$_2$N(CH$_3$)$_2$]Na$_3$[PW$_{10}$O$_{36}$], [C$_{18}$H$_{37}$N(CH$_3$)$_3$]$_5$K$_3$Na[PW$_9$O$_{34}$], [C$_{18}$H$_{37}$N(CH$_3$)$_3$]$_{10}$HNa[H$_2$P$_2$W$_{12}$O$_{48}$], [C$_{18}$H$_{37}$N(CH$_3$)$_3$]$_7$H$_3$Na$_2$[P$_2$W$_{15}$O$_{56}$], [C$_{18}$H$_{37}$N(CH$_3$)$_3$]$_7$H$_2$Na[P$_2$W$_{17}$O$_{61}$], [C$_{18}$H$_{37}$N(CH$_3$)$_3$]$_4$H$_3$Na$_2$[SiW$_{10}$O$_{36}$], [C$_{18}$H$_{37}$N(CH$_3$)$_3$]$_6$H$_2$Na[BW$_{10}$O$_{36}$], [C$_{18}$H$_{37}$N(CH$_3$)$_3$]$_7$[AsW$_{10}$O$_{36}$], [C$_{18}$H$_{37}$N(CH$_3$)$_3$]$_4$H$_2$Na[PMo$_{10}$O$_{36}$], [C$_{18}$H$_{37}$N(CH$_3$)$_3$]$_2$H$_4$Na[PW$_{10}$O$_{36}$], [C$_{18}$H$_{37}$N(CH$_3$)$_3$]$_5$HNa$_3$[PW$_9$O$_{34}$], or [C$_{18}$H$_{37}$N(CH$_3$)$_3$]$_4$HNa$_2$[PW$_{11}$O$_{39}$].

(4) A method for producing the catalyst according to any one of the above (1) to (3), comprising the steps of:

mixing a sodium, potassium, or ammonium salt of A oxyacid with a sodium, potassium, or ammonium salt of M oxyacid in water under an acidic or basic condition to obtain a mixed solution; and adding a aqueous solution of a Q-containing quaternary ammonium salt into the mixed solution.

(5) The method according to the above (4), wherein the sodium, potassium; or ammonium salt of A oxyacid is selected from the group consisting of sodium borate, potassium borate, ammonium borate, sodium phosphate, potassium phosphate, ammonium phosphate, sodium arsenate, potassium arsenate, ammonium arsenate, sodium silicate, potassium silicate, ammonium silicate, sodium aluminate, potassium aluminate, and ammonium aluminate.

(6) The method according to the above (4), wherein the sodium, potassium, or ammonium salt of M oxyacid is selected from the group consisting of sodium tungstate, potassium tungstate, ammonium tungstate, sodium molybdate, potassium molybdate, and ammonium molybdate.

(7) A use of the catalyst according to any one of the above (1) to (3) for the desulfurization and deodorization of gasoline.

(8) A method of the desulfurization and deodorization of gasoline by using the catalyst according to any one of the above (1) to (3), comprising the steps of:

mixing the catalyst and an aqueous solution of hydrogen peroxide, and then adding the gasoline to react them with stirring under conditions of 25 to 90° C. and 0.1 to 1 MPa for 10 to 180 min.

(9) The method according to the above (8), wherein relative to 100 ml of the gasoline, the amount of the catalyst is 10 mg to 4 g, and hydrogen peroxide is 6 to 50 mmol, and the concentration of hydrogen peroxide in the aqueous solution of hydrogen peroxide is 1% to 50% by mass.

The present invention also provides a method of the production of a deodorized gasoline by using the aforementioned catalyst, comprising the main steps of: mixing 10 mg to 4 g of a Q$_i$B$_m$H$_n$[A$_x$M$_y$O$_z$]$^{(1+m+n)-}$ catalyst with an aqueous solution of hydrogen peroxide, containing 6 to 50 mmol H$_2$O$_2$, which has a concentration of 1% to 50% by mass, followed by the addition of a gasoline to react them with stirring under conditions of 25 to 90° C. and 0.1 to 1 MPa for 10 to 180 min, and then ceasing the reaction, and separating and reusing the oil layer and the catalyst. The separation refers to settlement, filtration or centrifugation.

Comparing with the well-known technology, the present invention has the advantages of:

(1) In the method, the speed of the desulfurization and deodorization of gasoline is much rapid, and the efficiency is quite high.

(2) During the deodorization of gasoline, hydrogen peroxide is used as the oxidant, which has no pollution on the environment.

(3) Because it is a stoichiometric reaction, the amount of hydrogen peroxide consumed is much little, thus the cost of investment is low.

(4) The catalyst is easy to be prepared with high yield, and can be recycled, which not only reduce the production cost, but also preventing the residual catalyst from affecting the quality of oil product.

(5) With the method, there is no loss of the oil product during the deodorization.

DETAILED DESCRIPTION OF THE PREFERRED EMBODIMENTS

The following examples are given by way of illustration and therefore should not be construed to limit the scope of the invention.

Example 1

Figure 1:
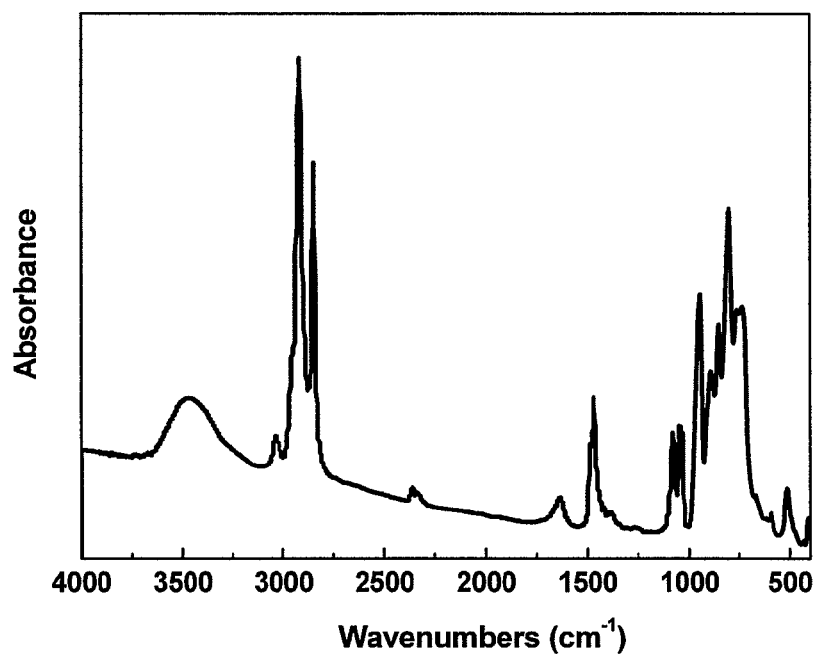
FIG. 1 shows the IR spectra of the catalyst A.
Figure 2:
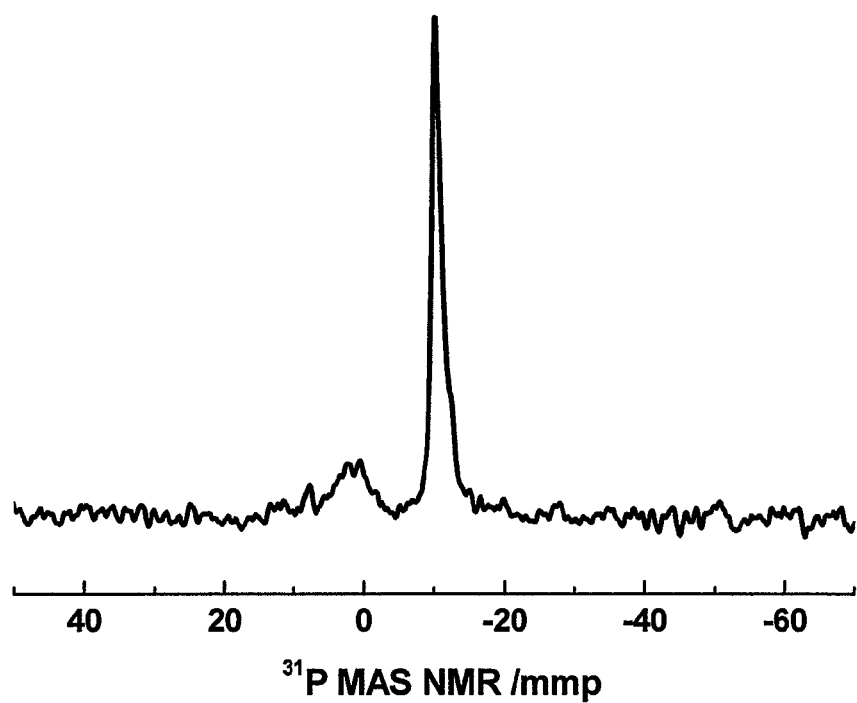
FIG. 2 shows the $^{31}$P MAS NMR of the catalyst A.

10 g ammonium metatungstate and 1.0 g sodium phosphate were weighted out respectively, and dissolved in 80 ml water. After vigorous stirring them in a water bath at 25° C. for 30 min, 40 ml 1M HNO$_3$ was added and a mixed solution was obtained after stirring them for 30 min. A solution of 2.6 g octadecyltrimethylammonium chloride in 10 ml water was added dropwise into the above mixed solution in a water bath at 80° C. for 1 hour while stirring vigorously, and a white precipitate forms immediately. The stirring was continued for 3 h. Lastly, 9.8 g white powdered solid catalyst was obtained after filtration, washing with water, and drying in vacuum. This catalyst is called as catalyst A. The molecular formula of the catalyst A is confirmed to be [C$_{18}$H$_{37}$N(CH$_3$)$_3$]$_4$H$_2$Na[PW$_{10}$O$_{36}$] by IR and NMR characterizations which are shown in the FIG. 1 and FIG. 2, respectively.

Example 2

Figure 3:
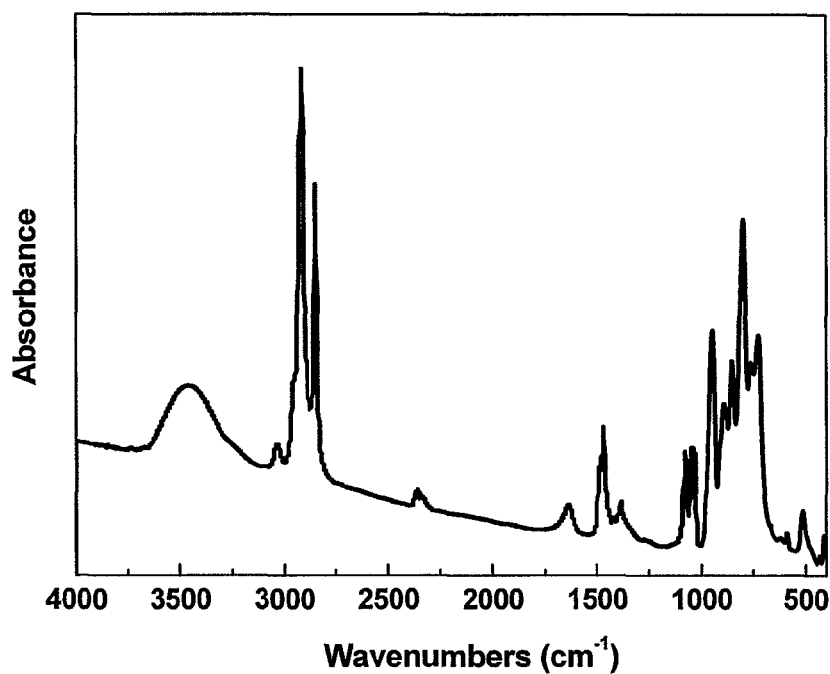
FIG. 3 shows the IR spectra of the catalyst B.

Except using 1.6 g octyltrimethyl quaternary ammonium salt instead of 2.6 g octadecyltrimethyl ammonium chloride in Example 1, the same procedures as those in Example 1 were performed, obtaining 8.5 g white powdered solid catalyst, which was called as catalyst B with the molecular formula [C$_8$H$_{17}$N(CH$_3$)$_3$]$_4$HNa$_2$[PW$_{10}$O$_{36}$]. The IR spectra characterization of catalyst B was shown in FIG. 3.

Example 3

Except using 2.0 g dodecyltrimethyl quaternary ammonium salt instead of 2.6 g octadecyltrimethyl ammonium chloride in Example 1, the same procedures as those in Example 1 were performed, obtaining 9.0 g white powdered solid catalyst, which was called as catalyst C with the molecular formula [C$_{12}$H$_{25}$N(CH$_3$)$_3$]$_4$H$_3$[PW$_{10}$O$_{36}$].

Example 4

Except using 2.4 g hexadecyltrimethyl quaternary ammonium salt instead of 2.6 g octadecyltrimethyl ammonium chloride in Example 1, the same procedures as those in Example 1 were performed, obtaining 9.3 g white powdered solid catalyst, which was called as catalyst D with the molecular formula [C$_{16}$H$_{33}$N(CH$_3$)$_3$]$_4$Na$_3$ [PW$_{10}$O$_{36}$].

Example 5

Except using 4.3 g quaternary ammonium salt $[(C_{18}H_{37})(75\%)+(C_{16}H_{33})(25\%)]_2N^+(CH_3)_2Cl$ instead of 2.6 g octadecyltrimethyl ammonium chloride in Example 1, the same procedures as those in Example 1 were performed, obtaining 11 g white powdered solid catalyst, which was called as catalyst E with the molecular formula $[(C_{18}H_{37})_2N(CH_3)_2]_3$ $[(C_{16}H_{33})_2N(CH_3)_2]Na_3 [PW_{10}O_{36}]$.

Example 6

The deodorization of FCC gasoline containing mercaptans and thioethers and having pungent odor from Shandong provided by Fushun Petrochemicals, SINOPEC (in which the total sulfur content was 793 ng/μl, and the sulfur content due to mercaptans and thioethers was 150 ng/μl):

(1) In 100 ml of the FCC gasoline in a triangular flask, 0.4 g catalyst A was added, and then 4 ml 30 wt % hydrogen peroxide was added, and they were stirred vigorously under 0.75 MPa in a water bath at 60° C. for 3 h; (2) The gasoline treated as above was centrifuged to recover the catalyst and the gasoline obtained was odorless, and any mercaptan and thioether was not detectable in the detection by GC-FPD (Agilent 6890N, technical specification of the detection limit was 20 pg sulfur/s (dodecyl mercaptan)). So absolute deodorization was achieved.

Sulfur content in the FCC gasoline before and after the reaction detected by microcoulometry analysis were 793 ng/μl and 618 ng/μl, respectively.

Example 7

Except using 10 mg catalyst B instead of 0.4 g catalyst B and 1 MPa reaction pressure instead of 0.75 MPa, the remaining operating conditions were the same as those in Example 6. The application results were the same as those in Example: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/μl and 623 ng/μl, respectively.

Example 8

Except using 1 g catalyst C instead of 0.4 g catalyst B and 25° C. water bath instead of 60° C. water bath, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/μl and 631 ng/μl, respectively.

Example 9

Except using 1 g catalyst D instead of 0.4 g catalyst B, stirring for 10 min instead of 3 h and 90° C. oil bath instead of 60° C. water bath, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/μl and 617 ng/μl, respectively.

Example 10

Except using E instead of catalyst B and 0.1 MPa reaction pressure instead of 0.75 MPa, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/μl and 622 ng/μl, respectively.

Example 11

Except using D instead of catalyst B and 170 ml 1 wt % hydrogen peroxide instead of 4 ml 30 wt % hydrogen peroxide, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/μl and 626 ng/μl, respectively.

Example 12

Except using D instead of catalyst B and 16 ml 10 wt % hydrogen peroxide instead of 4 ml 30 wt % hydrogen peroxide, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/μl and 628 ng/μl, respectively.

Example 13

Except using D instead of catalyst B and 8 ml 20 wt % hydrogen peroxide instead of 4 ml 30 wt % hydrogen peroxide, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/μl and 626 ng/μl, respectively.

Example 14

5.2 g ammonium metatungstate and 1.0 g sodium phosphate were dissolved in 80 ml water. Except using 1M $K_2CO_3$ solution instead of 1M $HNO_3$ solution, the remaining operating conditions were the same as those in Example 1, obtaining 6.5 g white powdered solid catalyst, which was called as catalyst F with the molecular formula $[C_{18}H_{37}N(CH_3)_3]_5 K_3Na[PW_9O_{34}]$.

Example 15

Except using 2M $K_2CO_3$ solution instead of 1M $HNO_3$ solution and adding 10 ml of 2M $(HOCH_2)_3CNH_2$ before the addition of 2M K$_2$CO$_3$ solution, the remaining operating conditions were the same as those in Example 1. The obtained catalyst was called as catalyst F with the molecular formula [C$_{18}$H$_{37}$N(CH$_3$)$_3$]$_{10}$HNa[H$_2$P$_2$W$_{12}$O$_{48}$].

Example 16

2.6 g ammonium metatungstate and 1.0 g sodium phosphate were dissolved in 80 ml water. The remaining operating conditions were the same as those in Example 1, obtaining 4.8 g white powdered solid catalyst, which was called as catalyst H with the molecular formula [C$_{18}$H$_{37}$N(CH$_3$)$_3$]$_7$H$_3$Na$_2$[P$_2$W$_{15}$O$_{56}$].

Example 17

6.5 g ammonium metatungstate and 1.0 g sodium phosphate were dissolved in 80 ml water. The remaining operating conditions were the same as those in Example 1, obtaining 8.0 g white powdered solid catalyst, which was called as catalyst I with the molecular formula [C$_{18}$H$_{37}$N(CH$_3$)$_3$]$_7$H$_2$Na[P$_2$W$_{17}$O$_{61}$].

Example 18

Except using 0.75 g Na$_2$SiO$_3$.9H$_2$O instead of sodium phosphate, the remaining operating conditions were the same as those in Example 1, obtaining 8.9 g white powdered solid catalyst, which was called as catalyst J with the molecular formula [C$_{18}$H$_{37}$N(CH$_3$)$_3$]$_4$H$_3$Na$_2$[SiW$_{10}$O$_{36}$].

Example 19

Except using 0.36 g NaBO$_2$.4H$_2$O instead of sodium phosphate, the remaining operating conditions were the same as those in Example 1, obtaining 8.3 g white powdered solid catalyst, which was called as catalyst K with the molecular formula [C$_{18}$H$_{37}$N(CH$_3$)$_3$]$_6$H$_2$Na[BW$_{10}$O$_{36}$].

Example 20

Except using 0.34 g NaAsO$_2$ instead of sodium phosphate, the remaining operating conditions were the same as those in Example 1, obtaining 8.4 g white powdered solid catalyst, which was called as catalyst L with the molecular formula [C$_{18}$H$_{37}$N(CH$_3$)$_3$]$_7$[AsW$_{10}$O$_{36}$].

Example 21

Except using 9.8 g Na$_2$MoO$_4$.2H$_2$O instead of ammonium metatungstate, the remaining operating conditions were the same as those in Example 1, obtaining 9.9 g white powdered solid catalyst, which was called as catalyst M with the molecular formula [C$_{18}$H$_{37}$N(CH$_3$)$_3$]$_4$H$_2$Na[PMo$_{10}$O$_{36}$].

Example 22

Except using 0.15 ml 85% H$_3$PO$_4$ solution instead of sodium phosphate, the remaining operating conditions were the same as those in Example 1, obtaining 9.4 g white powdered solid catalyst, which was called as catalyst N with the molecular formula [C$_{18}$H$_{37}$N(CH$_3$)$_3$]$_2$H$_4$Na[PW$_{10}$O$_{36}$].

Example 23

Figure 4:
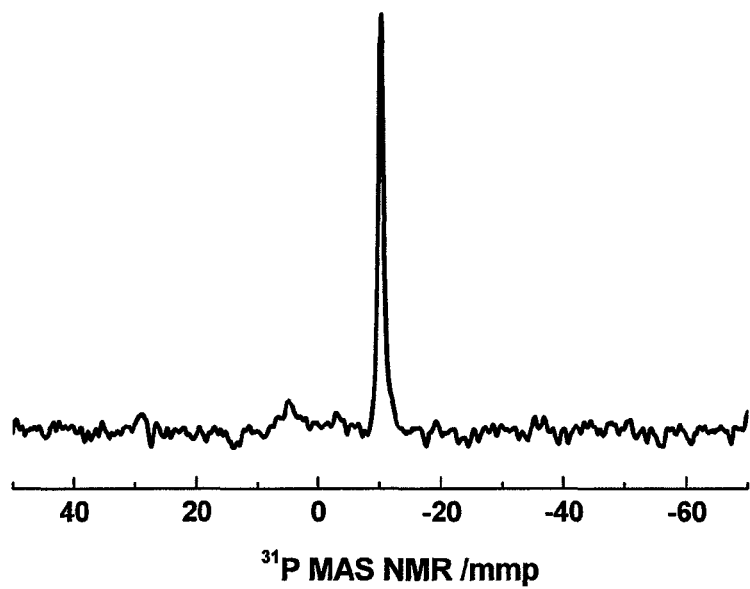
FIG. 4 shows the $^{31}$P MAS NMR of the catalyst O.

Except using 0.09 ml glacial acetic acid instead of 1M HNO$_3$ solution, the remaining operating conditions were the same as those in Example 1, obtaining 9.6 g white powdered solid catalyst, which was called as catalyst O with the molecular formula [C$_{18}$H$_{37}$N(CH$_3$)$_3$]$_5$HNa$_3$[PW$_9$O$_{34}$]. The NMR spectra characterization of catalyst O was shown in FIG. 4.

Example 24

Except using 10 ml dilute HCl having a volume ratio of 1:2 instead of 1M HNO$_3$ solution, the remaining operating conditions were the same as those in Example 1, obtaining 9.7 g white powdered solid catalyst, which was called as catalyst P with the molecular formula [C$_{18}$H$_{37}$N(CH$_3$)$_3$]$_4$HNa$_2$[PW$_{11}$O$_{39}$].

Example 25

Except using catalyst F, the fraction of FCC between 40-90° C. (in which the total sulfur content was 306 ng/μl, and the sulfur content due to mercaptans and thioethers was 88 ng/μl), and 2 ml 30 wt % hydrogen peroxide, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/μl and 210 ng/μl, respectively.

Example 26

Except using catalyst G, the fraction of FCC below 60° C. (in which the total sulfur content was 194 ng/μl, and the sulfur content due to mercaptans and thioethers was 72 ng/μl), and 1 ml 30 wt % hydrogen peroxide, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 194 ng/μl and 110 ng/μl, respectively.

Example 27

Except using catalyst H, 1 ml 50 wt % hydrogen peroxide, and FCC provided by Dalian Petrochemical Company (in which the total sulfur content was 160 ng/μl, and the sulfur content due to mercaptans and thioethers was 38 ng/μl), the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 160 ng/μl and 117 ng/μl, respectively.

Example 28

Except using catalyst I and 2 ml 30% hydrogen peroxide, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/µl and 633 ng/µl, respectively.

Example 29

Except using catalyst J, the remaining operating conditions were the same as those in Example 25. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/µl and 205 ng/µl, respectively.

Example 30

Except using catalyst K, the remaining operating conditions were the same as those in Example 25. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/µl and 201 ng/µl, respectively.

Example 31

Except using catalyst L, the remaining operating conditions were the same as those in Example 25. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/µl and 211 ng/µl, respectively.

Example 32

Except using catalyst M, the remaining operating conditions were the same as those in Example 25. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/µl and 198 ng/µl, respectively.

Example 33

Except using catalyst N, the remaining operating conditions were the same as those in Example 25. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/µl and 206 ng/µl, respectively.

Example 34

Except using catalyst O, the remaining operating conditions were the same as those in Example 25. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/µl and 203 ng/µl, respectively.

Example 35

Except using catalyst P, the remaining operating conditions were the same as those in Example 25. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 306 ng/µl and 214 ng/µl, respectively.

Example 36

Except using the catalyst recycled in Example 6, the remaining operating conditions were the same as those in Example 6. The application results were the same as those in Example 6: the gasoline obtained was odorless, and any mercaptan and thioether was not detectable in the detection by GC-FPD. So absolute deodorization was achieved.

Sulfur content in the FCC gasoline before and after the reaction detected by microcoulometry analysis were 793 ng/µl and 264 ng/µl, respectively.

It can be seen from all of the above examples that all of the catalysts can be reused.

It can be seen from all of the above examples that gasoline oil can be deodorized obviously by using the present method.

The invention claimed is:

1. A catalyst for desulfurization and deodorization of gasoline selected from one or more of the following catalysts: $[C_{18}H_{37}N(CH_3)_3]_{10}HNa[H_2P_2W_{12}O_{48}]$, $[C_{18}H_{37}N(CH_3)_3]_7H_3Na_2[P_2W_{15}O_{56}]$, and $[C_{18}H_{37}N(CH_3)_3]_7H_2Na[P_2W_{17}O_{61}]$.

* * * * *